March 13, 1962   P. E. HINKLE   3,025,367
TIMER SWITCH CIRCUIT
Filed May 27, 1958

INVENTOR.
PAUL E. HINKLE
BY
ATTORNEYS

United States Patent Office 3,025,367
Patented Mar. 13, 1962

3,025,367
TIMER SWITCH CIRCUIT
Paul E. Hinkle, Kokomo, Ind., assignor to Kingston Products Corporation, Chicago, Ill., a corporation of Indiana
Filed May 27, 1958, Ser. No. 738,123
1 Claim. (Cl. 200—38)

This invention relates generally to electric sequence timer control circuits and more specifically to an improved circuit enabling independent operation of two components under the control of a single timer switch blade.

Although the principles of the present invention may be included in various timers and appliance circuits, a particularly useful application is made in automatic washing machine circuits wherein either of two electrical components, such as valve solenoids, are to be alternatively individually or jointly energized. For example, contemporary washing machines include a water mixing valve having one portion connected to hot water under the control of one solenoid, and another portion connected to cold water under the control of a second solenoid. Depending upon the wishes of the operator, it is frequently desired to admit only hot water, only cold water, or to admit a mixture thereof. Furthermore, the operator may desire a different temperature or mixture of water for that portion of the cycle wherein tub filling is occurring, and for that portion of the cycle wherein rinsing of the laundered articles is occurring.

An example of a sequence timer which is utilized for this type of service is shown in the U.S. patent to A. R. Constantine No. 2,703,347. For convenience, the instant invention has been disclosed in connection with a fragmentary showing of such a timer. This timer includes a plurality of blade switches which are operated by a cam having a plurality of cam tracks, each of which is engageable with at least one contact blade, either directly or indirectly. Thus, in this timer, the cam tracks are disposed on a face of the cam and are concentrically arranged. It is to be understood that the instant invention is not to be limited to such timer construction, but, as will be apparent later herein, may also be readily incorporated in timers having axially spaced cams.

Heretofore, when the foregoing type of circuit has been desired, it has been necessary to utilize one timer switch and cam for each of the two coils of the water mixing valve. As modern automatic washers become more complex, there has been an increased demand for more circuits to be controlled by the timer.

In accordance with the principles of the instant invention, I have provided a novel blade switch which may be incorporated therein wherein the function previously carried out by two cam tracks may be carried out by a single track. This would appear to be an easy result to obtain by merely connecting more than one electrical component to a given switch. However, as will be brought out in the illustrated embodiment, the need frequently arises for the electrical components to be disconnected from each other when they are not energized. This requirement in combination with the elimination of one cam track has posed a problem which has heretofore been unsolved, in spite of the heavy development of switch art.

Accordingly, it is an object of the instant invention to provide a new and improved blade switch.

A further object of the present invention is to provide a switch wherein upon actuation thereof, two circuits are simultaneously energized, and upon breaking thereof, such circuits are not only deenergized but are rendered disconnected from each other.

Yet another object of the present invention is to provide an improved timer switch wherein two electrical components may selectively be alternatively individually and jointly energized by a single cam track wherein said components are disconnected from each other when deenergized.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

Figure 1:
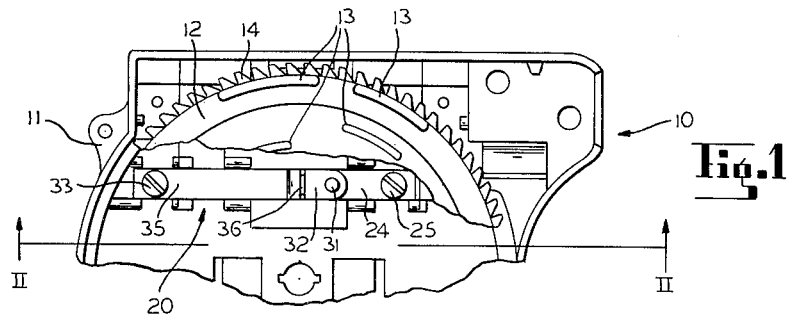
FIGURE 1 is a fragmentary view of a timer assembly, partially disassembled, equipped with a blade switch provided in accordance with the principles of the present invention.
Figure 2:
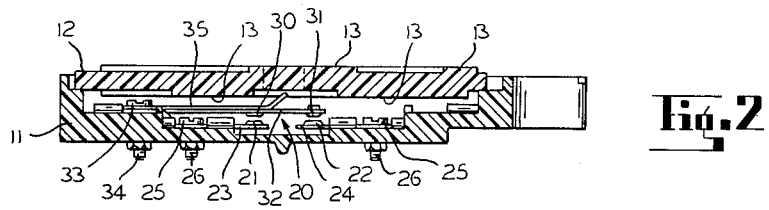
FIGURES 2 and 3 are fragmentary cross-sectional views of the timer assembly taken along line II—II of FIGURE 1, and showing the blade switch in the open and closed positions respectively.

The principles of this invention are particularly useful when embodied in an electrical sequence timer assembly such as illustrated in the above-identified patent to Constantine shown fragmentarily in FIGURE 1, generally indicated by the numeral 10. The timer assembly 10 includes a pair of similar case sections molded from an insulative material, one of which sections is represented by the base 11. The casing sections define a cavity within, which is disposed a rotary cam 12, which in this instance is provided with a set of cam tracks 13 concentrically disposed on each side of the cam 12. The instant cam 12 is adapted to be driven in discrete incremental steps by a stepping mechanism (not shown) which engages the peripheral teeth 14.

A blade switch assembly 20 is carried by the base 11 and disposed adjacent to one of the tracks in the cam set 13 for operation thereby. Switch 20 includes a first pair of contacts 21, 22 which are each supported by a contact blade 23, 24 respectively. The blades 23, 24 are each secured to the base 11 as by a screw 25 or rivet, and each of the contact blades 23, 24 communicates with a terminal 26, in this instance the outer portion of the screw 25, which is adapted for connection to an electrical component.

The switch assembly 20 also includes a second pair of contacts 30, 31 both carried by a single or common movable contact blade 32 which is fastened at one end to the base 11 as by a screw 33, the outer end of which is adapted for electrical connection to a circuit. If desired, a cam follower blade 35 may also be provided and is disposed on the opposite side of the contact blade 32 from that where the contacts 30 and 31 are located. The cam follower blade is secured by the screw 33 to the base 11, and has an angularly directed portion 36 which is adapted to engage one of the tracks of the set 13.

Thus the contacts 31, 22 and the contacts 30, 21 each represent a single pole single throw switch wherein each of the contacts communicate with terminals 26, 26 or 34, the movable contacts of both switches being carried by a common or single blade.

Figure 3:
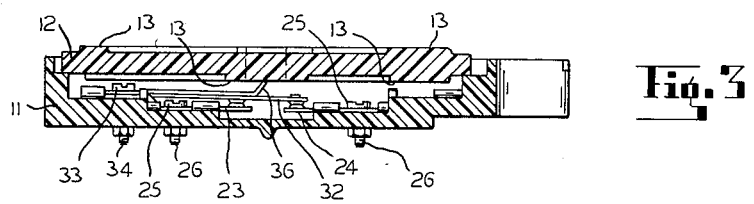

It will be appreciated that the stationary contacts 21, 22 are so termed for convenience and clarity, and that such term is a relative term, and is not intended to preclude any slight yielding of the stationary contact blades 23, 24 when engaged by the movable contacts as shown in FIGURE 3. It will also be appreciated that the base 11 is undercut at the stationary contacts 21, 22 to allow such slight movement or pressback, thereby aiding in keeping the contacts cool in a conventional manner. In the instant embodiment, the contact blades 23, 24 are disposed in a common plane, while the contact blade 32 is disposed in a plane spaced from the said common plane and intermediate said common plane and the cam 12.

When the cam 12 is rotated, one of the cam tracks engages the angular portion 36 whereby the cam follower causes the movable contact blade to deflect toward the stationary contacts 21, 22, and to positively engage them, as best seen in FIGURE 3. Further advance of the cam 12 permits the cam follower to drop off such cam track, thereby permitting the natural resiliency of the contact blade 32 to open the circuit at each of the contacts. It will be appreciated that when an electrical component is connected to each of the terminals 26, such electrical components may be simultaneously energized by the closing of the switch 20, and deenergized by the opening thereof, and that upon such opening, such electrical components become electrically isolated from each other.

Figure 4:
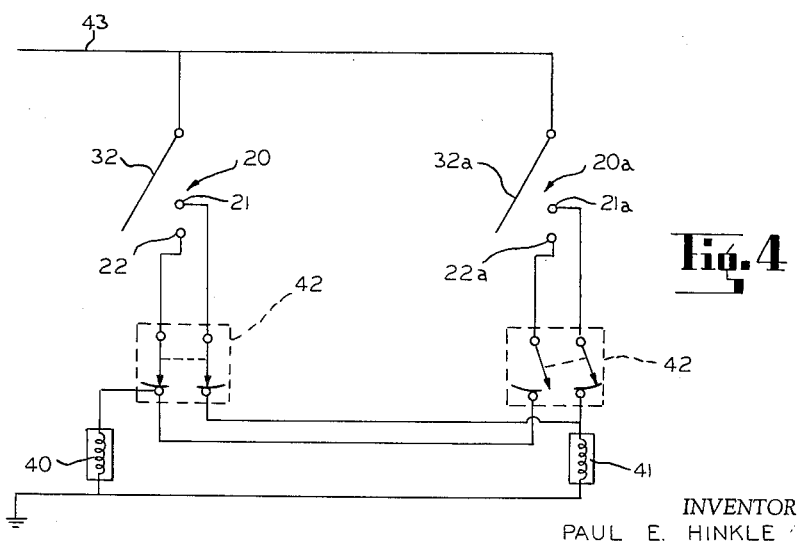
FIGURE 4 is a circuit diagram representing a portion of an appliance circuit including two switches of the type shown in FIGURE 1.

Referring now to FIGURE 4, there is shown a portion of the electrical circuit of an appliance, such as an automatic washing machine, wherein the particular advantage of the instant structure is illustrated. The coil 40 and the coil 41 each represent a solenoid on a water mixing valve. By way of illustration, the solenoid 40 when energized may be effective to admit hot water, and the solenoid 41 when energized may be effective to admit cold water. Obviously, when both solenoids are energized, a mixture of hot and cold water is admitted. Solenoids 40, 41 are under the control of a manual selector switch 42 which is connected in series with the coils 40, 41 and the blade switch assembly 20 of the timer 10. In this example, the contact 21 communicates with the coil 41, while the contact 22 communicates with the coil 40. The movable blade 32 is connected to a wire 43 leading to a source of current. When the selector switch 42 is set as shown, closing of the switch 20 effects simultaneous energizing of the coils 40 and 41. If the switch 42 were shifted to the right, the left hand portion thereof would open the circuit to the coil 40, while if the switch were shifted to the left, the right hand portion thereof would open the circuit to the coil 41. In either of these shifted positions, closing of the switch 20 would energize only such one of the coils 40, 41 as had been pre-selected, thereby obtaining only cold or only hot water. The program on the cam 12 may be such that the switch 20 is left closed for such time as is needed to fill the washing machine with water to initiate a washing cycle.

It will be apparent that a second identical blade switch assembly 20a may be utilized along with a second selector switch 42a and connected in parallel with the other structure. Of course, a different cam track would actuate the blade 32a so that the switch 20a and the selector switch 42a may be jointly selectably used to control the temperature of incoming water for a different portion of the program, such as a separate program for modern fabrics, or such as the water used for rinsing the articles washed.

Although various minor modifications might be suggested by those versed in the art, it should be understood that I wish to embody within the scope of the patent warranted hereon all such embodiments as reasonably and properly come within the scope of my contribution to the art.

I claim as my invention:

A circuit for controlling power to two electrical components in parallel circuit branches, including in combination: a sequence timer switch having two electrically common cammed blades, each respectively adapted to engage and to disengage simultaneously with one pair of two pairs of mutually insulated contacts for energizing and de-energizing the branches of the circuit therethrough; and a pair of selector switches each having two mutually insulated sections comovable with each other, one side of each of the four sections being connected respectively to the four contacts, the other side of one section in each of the selector switches being adapted to be connected to one of the components, and the other side of the other section in each of the selector switches being adapted to be connected to the other of the components; each of the selector switches being constructed to alternatively complete the circuit to either or both of said components; each of said cammed blades being thereby always operative to disconnect the components from each other when in an open position to enable either of the components to be energized alone through the other of the cammed blades.

References Cited in the file of this patent

UNITED STATES PATENTS

| | | |
|---|---|---|
| 2,341,931 | Lloyd | Feb. 15, 1944 |
| 2,572,553 | Wojcik | Oct. 23, 1951 |
| 2,579,717 | Wood | Dec. 25, 1951 |
| 2,606,990 | Akeley | Aug. 12, 1952 |
| 2,624,809 | Sinclaire | Jan. 6, 1953 |
| 2,627,567 | Bell | Feb. 3, 1953 |
| 2,758,181 | Crouch | Aug. 7, 1956 |
| 2,801,305 | Stolle et al. | July 30, 1957 |
| 2,803,715 | Guth | Aug. 20, 1957 |
| 2,818,487 | Kropp | Dec. 3, 1957 |
| 2,849,551 | Truesdell | Aug. 26, 1958 |
| 2,872,535 | Dahlgren | Feb. 3, 1959 |
| 2,920,153 | Horstmann | Jan. 5, 1960 |

FOREIGN PATENTS

| | | |
|---|---|---|
| 1,122,024 | France | May 14, 1956 |